(12) United States Patent
Erdtmann et al.

(10) Patent No.: US 6,527,844 B2
(45) Date of Patent: Mar. 4, 2003

(54) METAL COMPLEX FOR INK JET INK

(75) Inventors: David Erdtmann, Rochester, NY (US); Edgardo Lopez, Hilton, NY (US); Richard C. Van Hanehem, Rochester, NY (US); Steven Evans, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 59 days.

(21) Appl. No.: 09/794,608

(22) Filed: Feb. 27, 2001

(65) Prior Publication Data

US 2002/0157567 A1 Oct. 31, 2002

(51) Int. Cl.$^7$ ................................................. C09D 11/02
(52) U.S. Cl. ............................... 106/31.48; 106/31.49; 106/31.5; 106/31.58
(58) Field of Search .......................... 106/31.48, 31.58, 106/31.49, 31.5

(56) References Cited

U.S. PATENT DOCUMENTS

| | | | | |
|---|---|---|---|---|
| 4,420,550 A | * | 12/1983 | Evans et al. | 430/222 |
| 5,062,892 A | * | 11/1991 | Halko | 106/31.46 |
| 5,062,893 A | * | 11/1991 | Adamic et al. | 106/31.43 |
| 5,281,263 A | * | 1/1994 | Gregory et al. | 106/31.52 |
| 5,374,301 A | * | 12/1994 | Gregory et al. | 106/31.48 |
| 5,997,622 A | * | 12/1999 | Weber et al. | 106/31.48 |
| 6,001,161 A | | 12/1999 | Evans et al. | 106/31.48 |
| 6,011,161 A | * | 1/2000 | Kameswaran | 548/560 |
| 6,013,123 A | * | 1/2000 | Scarpetti | 106/31.13 |
| 6,059,868 A | | 5/2000 | Kasperchik | 106/31.27 |
| 6,183,548 B1 | * | 2/2001 | Erdtmann et al. | 106/31.27 |
| 2001/0045975 A1 | * | 11/2001 | Katsuragai et al. | 347/64 |

FOREIGN PATENT DOCUMENTS

EP   997504 A1 * 5/2000 ........... C09D/11/00

* cited by examiner

Primary Examiner—Helene Klemanski
(74) Attorney, Agent, or Firm—Harold E. Cole

(57) ABSTRACT

An ink jet ink composition comprising water, a humectant, a polyvalent transition metal complex of an 8-heterocyclylazo-5-hydroxy-quinoline and an anti-kogation material comprising an alkali metal salt of a monobasic organic or inorganic acid. Examples of anti-kogation materials useful in the invention include sodium hexanoate, sodium sulfate, sodium propionate, sodium benzoate, sodium p-toluenesulfonate, sodium acetate, sodium bromide, sodium nitrate, potassium nitrate, lithium nitrate, lithium acetate, tetramethylammonium acetate and tetrabutylammonium bromide.

18 Claims, No Drawings

METAL COMPLEX FOR INK JET INK

CROSS REFERENCE TO RELATED APPLICATION

Reference is made to commonly assigned, co-pending U.S. patent application Ser. No. 09/794,604 by Erdtmann et al., filed of even date herewith entitled "Ink Jet Printing Method".

FIELD OF THE INVENTION

This invention relates to a certain metal complex useful as a colorant in combination with an anti-kogation material in an ink jet ink composition.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant, which is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier media include water, mixtures of water and organic co-solvents and high boiling organic solvents, such as hydrocarbons, esters, ketones, etc.

The choice of a colorant in ink jet systems is critical to image quality. For colors such as cyan, magenta, yellow, green, orange, etc., the peak wavelength (λ-max), the width of the absorption curve and the absence of secondary absorptions are important. The colorants should also have a high degree of light fastness after printing onto the ink-receiving element. For aqueous dye-based inks, the dyes need to be sufficiently soluble in water to prepare a solution that is capable of producing adequate density on the receiving element and stable for extended periods of storage without precipitation. High quality ink jet printing with dye-based inks requires dyes which will provide both bright hue and good light stability. It is difficult to find dyes which meet all of these requirements, particularly magenta dyes.

Kogation occurs on a thermal ink jet heater plate as a result of thermal decomposition of ink components or accumulation of intact ink components. An anti-kogation material can be used in an ink jet ink composition to prevent buildup of thermal decomposition products on a heater plate in a thermal ink jet print head.

U.S. Pat. No. 6,001,161 relates to a magenta metal complex dye for an ink jet ink. However, there is a problem with this dye in that the maximum density of a printed image decreases over time with magenta inks containing this dye.

U.S. Pat. No. 6,059,868 relates to anti-kogation materials useful in ink jet printing. However, when these anti-kogation materials are used with metal-complex dyes, the resulting printed image have poor image quality.

It is an object of this invention to provide an ink jet ink composition containing a magenta metal complex in combination with an anti-kogation material that has both good light stability and bright hue, and is able to provide consistent density when printed in a thermal ink jet printer.

SUMMARY OF THE INVENTION

This and other objects are achieved in accordance with this invention which relates to an ink jet ink composition comprising water, a humectant, a polyvalent transition metal complex of an 8-heterocyclylazo-5-hydroxy-quinoline and an anti-kogation material comprising an alkali metal salt of a monobasic organic or inorganic acid.

Use of this ink composition provides images with a combination of outstanding light stability, bright magenta hue and consistent densities.

DETAILED DESCRIPTION OF THE INVENTION

In a preferred embodiment of the invention, the polyvalent transition metal complexes of an 8-heterocyclylazo-5-hydroxyquinoline employed have the following general structure:

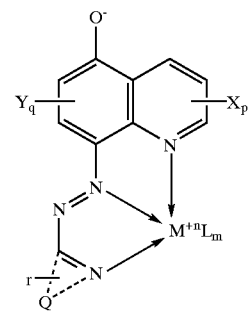

1 wherein:

M represents a polyvalent transition metal ion;

each L independently represents a neutral or anionic ligand;

each X, Y and Z independently represents a substituted or unsubstituted alkyl group of 1–6 carbon atoms, a substituted or unsubstituted aryl group of 6–10 carbon atoms, a substituted or unsubstituted hetaryl group of 5–10 atoms, halogen, cyano, nitro, a substituted or unsubstituted alkoxycarbonyl group of 1–6 carbon atoms, a substituted or unsubstituted alkoxy group of 1–6 carbon atoms, hydroxy, a polyoxyalkylene group of 2–20 alkylene oxide residues, carboxy or a salt thereof, sulfo or a salt thereof, phospho or a salt thereof, carbamoyl, a substituted or unsubstituted alkyl-, aralkyl-, aryl-, diaryl- or dialkyl-carbamoyl group of 1–20 carbon atoms, sulfamoyl, a substituted or unsubstituted alkyl-, aralkyl-, aryl-, diaryl- or dialkyl-sulfamoyl group of 1–20 carbon atoms, acylamino, sulfonylamino, amino, a substituted or unsubstituted alkyl-, aralkyl-, aryl-, diaryl- or dialkyl-amino group of 1–20 carbon atoms or a quaternary ammonium or phosphonium group;

Q represents the atoms necessary to complete a 5- or 6-membered heterocyclic ring;

n represents 2 or 3;

m represents an integer from 1–3;

each p and r independently represents an integer from 0–3;

q represents 0, 1 or 2;

two or more of L may be joined together to form a bi- or tridentate ligand which may optionally comprise another polydentate molecule of the same or different structure as shown above;

one or more of L may be combined with X and/or Z;

one or more of X, Y and Z, together with the carbon to which they are attached, may independently represent a ring nitrogen; and any two of X, Y or Z may be joined together to form a 5–7 membered saturated or unsaturated ring;

Compositions in which two or more of the above metal complex dyes represented by structure 1 are joined covalently are also considered to be within the scope of this invention.

Preferred transition metal ions for 1 include $Ni^{2+}$, $Cu^{2+}$, $Zn^{2+}$, $Fe^{2+}$, $Fe^{3+}$, $Cr^{3+}$, $Pd^{2+}$, $Pt^{2+}$ and $Co^{2+}$.

Examples of neutral ligands (L) for 1 include water, pyridine, morpholine and ammonia. Examples of bi- and tri-dentate ligands include bipyridine, terpyridine, iminodiacetate, glycine and 8-hydroxyquinoline.

Examples of anionic ligands (L) include acetate, chloride and cyanate.

For X, Y and Z in 1, examples of a substituted or unsubstituted alkyl group include methyl, ethyl, isopropyl, hydroxyethyl, 3-(N,N-dimethylamino)propyl, sulfatoethyl and benzyl. Examples of a substituted or unsubstituted aryl group include phenyl, naphthyl, 4-chlorophenyl and 2-carboxyphenyl. Examples of a substituted or unsubstituted hetaryl group include pyridyl, imidazolyl and quinolyl. Examples of halogen include chloro, fluoro, bromo and iodo. Examples of a substituted or unsubstituted alkoxy group include methoxy, isopropoxy, 2-hydroxyethoxy and carboxymethoxy. Useful salts of carboxy, sulfo, phospho and sulfato include sodium, lithium, potassium, triethanolammonium, pyridinium and tetramethylammonium. Examples of a substituted or unsubstituted alkyl-, aralkyl-, aryl-, diaryl- or dialkyl-carbamoyl group include N-methylcarbamoyl, N-methyl-N-(3-sulfophenyl)-carbamoyl, N-p-(trimethylammonium)phenylcarbamoyl and N,N-bis (4-carboxyphenyl)carbamoyl. Examples of a substituted or unsubstituted alkyl-,aralkyl-, aryl-, diaryl- or dialkyl-sulfamoyl group include N-methylsulfamoyl, N-methyl-N-(3-sulfophenyl)-sulfamoyl, N-p-(trimethylammonium)phenylsulfamoyl and N,N-bis (4-carboxyphenyl)sulfamoyl. Examples of an acylamino group include acetamido, carboxyethylacetamido and benzamido. Examples of a ureido group include n-methylureido, ureido and 3,5-bis carboxyphenylureido. Examples of a sulfonylamino group include methanesulfonamido, p-toluenesulfonamido and 2-(trimethlyammonium)ethanesulfonamido. Examples of a substituted or unsubstituted alkyl-, aralkyl-, aryl-, diaryl- or dialkyl-amino group include methylamino, N,N-dimethylamino, carboxymethylamino and 2,5-disulfoanilino. Examples of a quaternary ammonium group include trimethylammonium and benzyldimethylammonium. Examples of a phosphonium group include triphenylphosphonium and trimethylphosphonium.

Examples of heterocyclic ring systems completed by the atoms represented by Q include pyridine, pyrazine, quinoline, thiazole, benzothiazole and pyrazole.

In a preferred embodiment of the invention, M is $Ni^{2+}$. In another preferred embodiment, $L_m$ comprises an 8-heterocyclylazo-5-hydroxyquinoline. In yet another preferred embodiment, X is a chloro, methyl, alkoxy or carboxy. In still another preferred embodiment, Y is hydrogen, and Z is hydrogen or alkylsulfamoyl. In still yet another preferred embodiment, Q represents the atoms necessary to complete a pyridine ring.

U.S. Pat. No. 4,420,550 and Example 1 hereafter describe general synthetic procedures for preparing the metal complexes employed in this invention.

Representative examples of dyes which may be employed in this invention include the following:

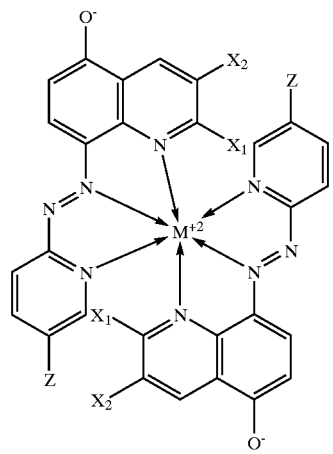

| Dye | M | $X_1$ | $X_2$ | Z | λ-max[1] |
|---|---|---|---|---|---|
| 1 | Ni | Cl | $CO_2H$ | $SO_2NH$(i-Pr) | 559 |
| 2 | Cu | Cl | $CO_2H$ | $SO_2NH$(i-Pr) | 547 |
| 3 | Ni | Cl | $CO_2Na$ | H | 550 |
| 4 | Ni | Cl | $CO_2H$ | H | 551 |
| 5 | Ni | H | $CO_2H$ | H | 546 |
| 6 | Ni | $CH_3$ | $CO_2H$ | H | 552 |
| 7 | Ni | $CO_2H$ | $CO_2H$ | H | 554 |

-continued
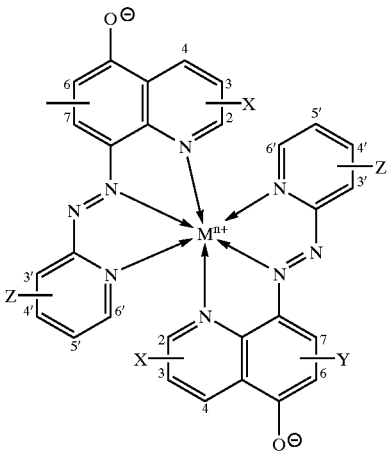
| Dye | $M^{n+}$ | X | Y | Z |
|---|---|---|---|---|
| 8 | $Ni^{2+}$ | 3-$CO_2H$<br>4-Cl | H | H |
| 9 | $Co^{2+}$ | 2-Cl<br>3-$CH_3$ | 6-$CH_3$ | 5'-$SO_3$-$Na^+$ |
| 10 | $Cr^{3+}$ | 2-Cl<br>3-CONH-($C_2H_4N(CH_3)_2$) | H | 6'-Cl |
| 11 | $Ni^{2+}$ | H | H | 4',5'-$(CO_2H)_2$ |
| 12 | $Cu^{2+}$ | 2-$NHC_3H_6N$-$(CH_3)_2$ | 6,7-$(CH_3)_2$ | H |
| 13 | $Ni^{2+}$ | 2-Cl<br>3-[$C_6H_3$-3,5-$(SO_3Na)_2$] | 7-$CO_2H$ | 5'-Cl |
| 14 | $Ni^{2+}$ | 2,3-$Cl_2$ | 6-OH | 5'-$SO_2NH[C_3H_6N(CH_3)_2]_2$ |
| 15 | $Cu^{2+}$ | 3-$CONHC_2H_4$-($N^+CH_3)_3Cl^-$ | 6-CN | 4'-$CONH_2$ |
| 16 | $Ni^{2+}$ | 2-Cl<br>3-$SO_2NHC_2H_4OSO_3$-$Na^+$ | H | H |
[1] Measured in 1% aqueous triethanolamine
Dye 17
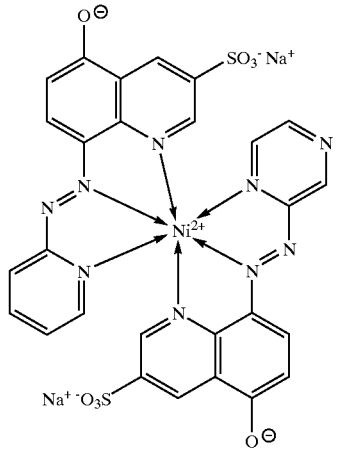

-continued
Dye 18
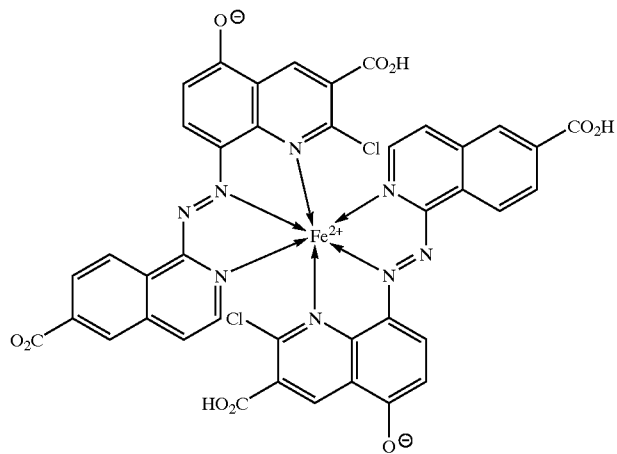
Dye 19
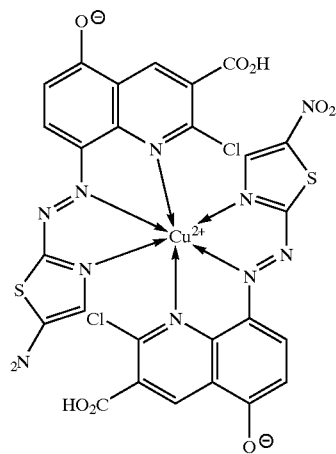
Dye 20
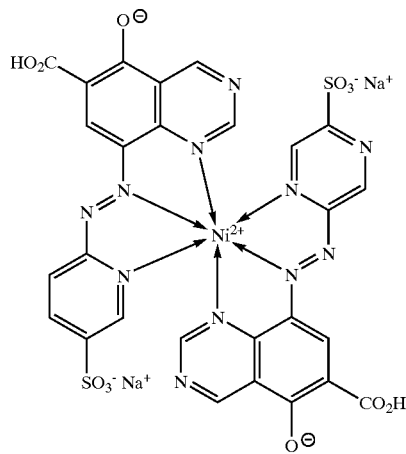

-continued

Dye 21

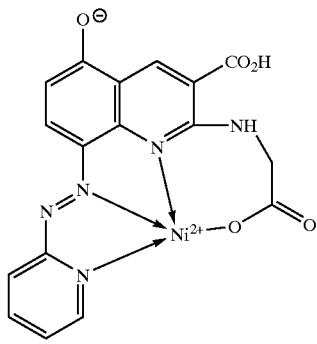

Dye 22

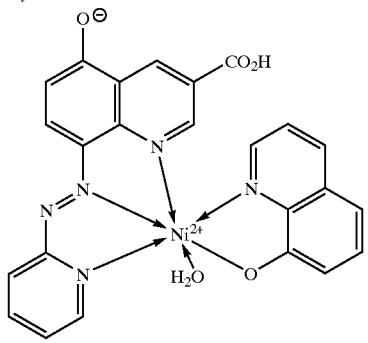

As noted above, an anti-kogation material is used in the ink jet composition of the invention and comprises an alkali metal salt of a monobasic organic or inorganic acid. In another preferred embodiment of the invention, the anti-kogation material is sodium hexanoate, sodium sulfate, sodium propionate, sodium benzoate, sodium p-toluenesulfonate, sodium acetate, sodium bromide, sodium nitrate, potassium nitrate, lithium nitrate, lithium acetate, tetramethylammonium acetate or tetrabutylanimonium bromide. The anti-kogation material may be present in the ink jet ink composition in an amount of from about 0.1 to about 10 weight %, preferably from about 0.25 to about 5 weight %.

A humectant is employed in the ink jet composition of the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as 2-pyrrolidone, N-methyl-2-pyrrolidone, and 1,3-dimethyl-2imidazolidinone; and sulfur-containing compounds such as dimethyl sulfoxide and tetramethylene sulfone. A preferred humectant for the composition of the invention is diethylene glycol, glycerol, 2-pyrrolidone or diethylene glycol monobutylether.

Water-miscible organic solvents may also be added to the aqueous ink of the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydro-furfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

Surfactants may be added to adjust the surface tension of the ink to an appropriate level. The surfactants may be anionic, cationic, amphoteric or nonionic.

A biocide may be added to the composition of the invention to suppress the growth of micro-organisms such as molds, fungi, etc. in aqueous inks. A preferred biocide for the ink composition of the present invention is Proxel® GXL (Zeneca Specialties Co.) at a final concentration of 0.05–0.5 wt. %.

The pH of the aqueous ink compositions of the invention may be adjusted by the addition of organic or inorganic acids or bases. Useful inks may have a preferred pH of from about 2 to 10, depending upon the type of dye or pigment being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

A typical ink composition of the invention may comprise, for example, the following substituents by weight: colorant (0.05–5%), water (20–95%), humectant (5–70%), water miscible co-solvents (2–20%), surfactant (0.1–10%), biocide (0.05–5%) and pH control agents (0.1–10%).

Additional additives which may optionally be present in the ink jet ink composition of the invention include thickeners, conductivity enhancing agents, drying agents, and defoamers.

The ink jet inks provided by this invention may be employed in ink jet printing wherein liquid ink drops are applied in a controlled fashion to an ink receptive layer substrate, by ejecting ink droplets from a plurality of nozzles or orifices of the print head of an ink jet printer.

Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

The following examples illustrate the utility of the present invention.

EXAMPLES

Example 1

Synthesis of Dye 6

A solution of 2.75 g (0.01 mole) ethyl-(2-methyl-5,8-dimethoxy)-quinoline-3-carboxylate (see U.S. Pat. No. 4,656,283) in 50 mL of tetrahydrofuran (THF) was diluted with 100 mL of ethylacetate. To this solution was added a solution of 13.71 g (0.025 mole) of ceric ammonium nitrate in 50 mL of water and the 2-phase mixture stirred at room temperature for 1.5 hr. The phases were separated and the upper, organic layer washed twice with 25 mL of water and once with saturated NaCl. After drying over $MgSO_4$, the organic layer was evaporated to dryness at less than 40° C. The residual solid was suspended in 100 mL of ethanol containing 0.5 mL of concentrated hydrochloric acid and treated with a solution of 1.09 g (0.01 mole) of 2-hydrazinopyridine in 20 mL of ethanol containing 0.5 mL of concentrated hydrochloric acid. After stirring 18 hr at ambient temperature and chilling to 0° C., the solid product was collected by filtration. The crude dye-ester was purified by digestion with 25 mL of boiling ethanol, chilling and filtering. The yield was 1.3 g (51% of theory) of ethyl-(2-methyl-5-hydroxy-8-[2-pyridylazo])-quinoline-3-carboxylate as a dark red solid.

The dye-ester from above (1.18 g, 0.0035 mole) was hydrolyzed by warming at 40° C. in a mixture of THF/methanol/water (7:25:5) containing 0.7 g NaOH (0.0175 mole) for 2 hr. After dilution with 100 mL water, the deep orange solution was acidified to pH~3 with dilute hydrochloric acid and the resulting yellow-orange solid collected by filtration. The crude dye-acid was purified by digestion with 15 mL of boiling acetonitrile, chilling and filtering to give 1.0 g (92 % of theory) of 2-methyl-5-hydroxy-8-(2-pyridylazo)-quinoline-3-carboxylic acid.

The dye-acid from above (1.0 g, 0.00325 mole) was suspended in 10 mL of dimethylformamide and treated with a solution of 0.4 g (0.00162 mole) nickel(II)acetate tetrahydrate in 3 mL water. The red-magenta solution was warmed at 75° C. for 1 hour, cooled to ambient temperature and diluted with 50 mL water and the crude Dye 6 was collected by filtration. After digestion with 20 mL of acetonitrile, chilling and filtering, 1.0 g (91% of theory) of Dye 6 was obtained as a dark red-green solid. The UV-visible spectrum was obtained in 1% triethanolamine/water and gave a λ-max of 552 nm. The mass spectrum was determined with a quadropole mass spectrometer utilizing Electrospray Ionization set up to detect negatively charged ions. The spectrum exhibited major peaks at m/e 671 and 673 consistent with the structure of Dye 6 (formula weight 672, $^{58}Ni$).

Preparation of Inks

Control Ink C-1

One liter of ink was prepared containing 0. 55% dry Dye 6, 7.5% diethylene glycol, 7.5% glycerol, 4.0% 2-pyrrolidinone, 0.30% Surfynol ®465 (Air Products), 0.10% of Rhodia Rhodasurf® LA-9, and the balance deionized water. The ink pH was adjusted to approximately 7 by the addition of triethanolamine. The ink loaded into a 25.4 cm Allegheny Bradford filter housing and filtered through a Pall® 4.5 μ filter followed by a Pall® DFA filter.

Control Ink C-2

One liter of ink was prepared like Control Ink C-1, except 0.90% ammonium nitrate (Acros) was added. Ammonium nitrate is an anti-kogation material described in U.S. Pat. No. 6,059,868 (see Liquids 1b, 1c, 2b, 2c, 3b and 3c in Table VI).

Control Ink C-3

One liter of ink was prepared like Control Ink C-1, except 0.60% sodium carbonate (Aldrich), an alkali metal salt of a dibasic inorganic acid, was added.

Control Ink C-4

One liter of ink was prepared like Control Ink C-1, except 1.26% sodium tartrate dihydrate (Kodak), an alkali metal salt of a dibasic organic acid, was added.

Control Ink C-5

One liter of ink was prepared like Control Ink C-1, except 1.08% sodium citrate dihydrate (Kodak), an alkali metal salt of a dibasic organic acid, was added.

Invention Ink 1

One liter of ink was prepared like Control Ink C-1, except 0.90% sodium hexanoate (Aldrich) was added.

Invention Ink 2

One liter of ink was prepared like Control Ink C-1, except 1.56% sodium sulfate (Aldrich) was added.

Invention Ink 3

One liter of ink was prepared like Control Ink C-1, except 1.07% sodium propionate (Aldrich) was added.

Invention Ink 4

One liter of ink was prepared like Control Ink C-1, except 1.60% sodium benzoate (Kodak) was added.

Invention Ink 5

One liter of ink was prepared like Control Ink C-1, except 2.16% sodium p-toluene sulfonate, sodium salt (Aldrich) was added.

Invention Ink 6

One liter of ink was prepared like Control Ink C-1, except 1.13% potassium nitrate (Aldrich) was added.

Invention Ink 7

One liter of ink was prepared like Control Ink C-1, except 0.76% lithium nitrate (Aldrich) was added.

Invention Ink 8

One liter of ink was prepared like Control Ink C-1, except 0.90% sodium nitrate (Kodak) was added.

Invention Ink 9

One liter of ink was prepared like Control Ink C-1, except 0.90% sodium acetate (Aldrich) was added.

Invention Ink 10

One liter of ink was prepared like Control Ink C-1, except 3.53% tetrabutylammonium bromide (Aldrich) was added.

Invention Ink 11

One liter of ink was prepared like Control Ink C-1, except 1.11% sodium bromide (EM Science) was added.

Printing of Test Images

Each of the above inks was filled into a reservoir of an Encad 700 printer and into an empty Encad GS ink cartridge. An image quality target that contained a small 2.0 square cm magenta patch was printed onto KODAK PROFESSIONAL EI Premium Media and the initial density was measured using an X-Rite densitometer. A prime target was printed to make sure all of the nozzles were firing correctly and there were no electrical failures. An electrical failure may occur when there is either an electrical short to ground so that the heater is by-passed and insufficient heat is generated in the heater, or there is a significant increase in resistance in the heater circuit, which would also inhibit generation in the heater in the printhead. Either of these phenomena causes the nozzle not to operate.

A large 100% magenta patch target (92 by 610 cm) was then printed that consumed 25 ml of ink. A second image quality target was printed onto KODAK PROFESSIONAL EI Premium Media and the density was remeasured. A prime target was printed to make sure all of the nozzles were firing correctly and there were no electrical failures. This test was repeated until a total of 300ml of ink was fired through a single Encad printhead. The percent density retained between the initial image quality target and the image quality target printed after 300 ml of ink had been fired is shown in Table 1. If any nozzles have had an electrical failure during the 300 ml test, it is recorded in Table 1, and the ink is considered unacceptable.

Each image quality target was evaluated for image defects such as banding, bronzing, or bleed. A qualitative rating of excellent, good, fair, and poor was given to each ink printed onto KODAK PROFESSIONAL EI Premium Media, and is shown in Table 1. An ink must have improved density retention, excellent or good image quality, and no electrical failures to be considered acceptable.

TABLE 1

| Ink | Percent Density Retained | Image Quality | Electrical Failure |
|---|---|---|---|
| 1 | 83% | Excellent | No |
| 2 | 83% | Excellent | No |
| 3 | 89% | Excellent | No |
| 4 | 89% | Excellent | No |
| 5 | 85% | Excellent | No |
| 6 | 100% | Excellent | No |
| 7 | 95% | Excellent | No |
| 8 | 89% | Excellent | No |
| 9 | 88% | Excellent | No |
| 10 | 93% | Good | No |
| 11 | 86% | Excellent | No |
| C-1 | 66% | Excellent | No |
| C-2 | 100% | Poor | No |
| C-3 | 100% | Excellent | Yes |
| C-4 | 79% | Excellent | Yes |
| C-5 | 84% | Excellent | Yes |

The above results show that the ink jet ink compositions of the invention yield images with excellent image quality, have improved retained density, and do not cause electrical failures of the printhead.

The invention has been described in detail with particular reference to certain preferred embodiments thereof, but it will be understood that variations and modifications can be effected within the spirit and scope of the invention.

What is claimed is:

1. An ink jet ink composition comprising water, a humectant, a polyvalent transition metal complex of an 8-heterocyclylazo-5-hydroxy-quinoline and a separate anti-kogation material comprising an alkali metal salt of a monobasic organic or inorganic acid.

2. The composition of claim 1 wherein said complex has the following structure:

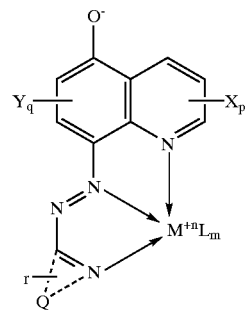

wherein:
M represents a polyvalent transition metal ion;
each L independently represents a neutral or anionic ligand;
each X, Y and Z independently represents a substituted or unsubstituted alkyl group of 1–6 carbon atoms, a substituted or unsubstituted aryl group of 6–10 carbon atoms, a substituted or unsubstituted hetaryl group of 5–10 atoms, halogen, cyano, nitro, a substituted or unsubstituted alkoxycarbonyl group of 1–6 carbon atoms, a substituted or unsubstituted alkoxy group of 1–6 carbon atoms, hydroxy, a polyoxyalkylene group of 2–20 alkylene oxide residues, carboxy or a salt thereof, sulfo or a salt thereof, phospho or a salt thereof, carbamoyl, a substituted or unsubstituted alkyl-, aralkyl-, aryl-, diaryl- or dialkyl-carbamoyl group of 1–20 carbon atoms, sulfamoyl, a substituted or unsubstituted alkyl-, aralkyl-, aryl-, diaryl- or dialkyl-sulfamoyl group of 1–20 carbon atoms, acylamino, sulfonylamino, amino, a substituted or unsubstituted alkyl-, aralkyl-, aryl-, diaryl- or dialkyl-amino group of 1–20 carbon atoms or a quaternary ammonium or phosphonium group;
Q represents the atoms necessary to complete a 5- or 6-membered heterocyclic ring;
n represents 2 or 3;
m represents an integer from 1–3;
each p and r independently represents an integer from 0–3;
q represents 0, 1 or 2;
two or more of L may be joined together to form a bi- or tridentate ligand which may optionally comprise another polydentate molecule of the same or different structure as shown above;
one or more of L may be combined with X and/or Z;
one or more of X, Y and Z, together with the carbon to which they are attached, may independently represent a ring nitrogen; and
any two of X, Y or Z may be joined together to form a 5–7 membered saturated or unsaturated ring.

3. The composition of claim 2 wherein M is $Ni^{2+}$.

4. The composition of claim 2 wherein $L_m$ comprises an 8-heterocyclylazo-5-hydroxyquinoline.

5. The composition of claim 2 wherein X is chloro, methyl, alkoxy or carboxy.

6. The composition of claim 2 wherein Y is hydrogen.

7. The composition of claim 2 wherein Z is hydrogen or alkylsulfamoyl.

8. The composition of claim 2 wherein Q represents the atoms necessary to complete a pyridine ring.

9. The composition of claim 1 wherein said composition also contains a water-miscible organic solvent.

10. The composition of claim 1 wherein said humectant is diethylene glycol, glycerol, 2-pyrrolidinone or diethylene glycol monobutylether.

11. The composition of claim 1 wherein said metal complex comprises about 0.05 to about 5 % by weight of said ink jet ink composition.

12. The composition of claim 1 wherein said anti-kogation material is present in said ink jet ink composition in an amount of from about 0.1 to about 10 weight %.

13. The composition of claim 1 wherein said anti-kogation material is present in said ink jet ink composition in an amount of from about 0.25 to about 5 weight %.

14. An ink jet ink composition comprising water, a humectant, a polyvalent transition metal complex of an 8-heterocyclylazo-5-hydroxy-quinoline and an anti-kogation material comprising sodium hexanoate, sodium sulfate, sodium propionate, sodium benzoate, sodium p-toluenesulfonate, sodium acetate, sodium bromide, sodium nitrate, potassium nitrate, lithium nitrate, lithium acetate, tetramethylammonium acetate or tetrabutylammonium bromide.

15. The composition of claim 14 wherein said complex has the following structure:

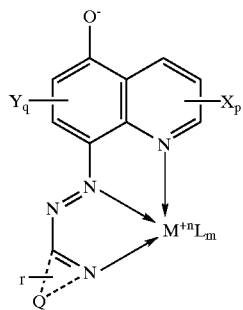

wherein:
M represents a polyvalent transition metal ion;
each L independently represents a neutral or anionic ligand;
each X, Y and Z independently represents a substituted or unsubstituted alkyl group of 1–6 carbon atoms, a substituted or unsubstituted aryl group of 6–10 carbon atoms, a substituted or unsubstituted hetaryl group of 5–10 atoms, halogen, cyano, nitro, a substituted or unsubstituted alkoxycarbonyl group of 1–6 carbon atoms, a substituted or unsubstituted alkoxy group of 1–6 carbon atoms, hydroxy, a polyoxyalkylene group of 2–20 alkylene oxide residues, carboxy or a salt thereof, sulfo or a salt thereof, phospho or a salt thereof, carbamoyl, a substituted or unsubstituted alkyl-, aralkyl-, aryl-, diaryl- or dialkyl-carbamoyl group of 1–20 carbon atoms, sulfamoyl, a substituted or unsubstituted alkyl-, aralkyl-, aryl-, diaryl- or dialkyl-sulfamoyl group of 1–20 carbon atoms, acylamino, sulfonylamino, amino, a substituted or unsubstituted alkyl-, aralkyl-, aryl-, diaryl- or dialkyl-amino group of 1–20 carbon atoms or a quaternary ammonium or phosphonium group;

Q represents the atoms necessary to complete a 5- or 6-membered heterocyclic ring;

n represents 2 or 3;

m represents an integer from 1–3;

each p and r independently represents an integer from 0–3;

q represents 0, 1 or 2;

two or more of L may be joined together to form a bi- or tridentate ligand which may optionally comprise another polydentate molecule of the same or different structure as shown above;

one or more of L may be combined with X and/or Z;

one or more of X, Y and Z, together with the carbon to which they are attached, may independently represent a ring nitrogen; and any two of X, Y or Z may be joined together to form a 5–7 membered saturated or unsaturated ring.

16. The composition of claim 14 wherein said metal complex comprises about 0.05 to about 5 % by weight of said ink jet ink composition.

17. The composition of claim 14 wherein said anti-kogation material is present in said ink jet ink composition in an amount of from about 0.1 to about 10 weight %.

18. The composition of claim 14 wherein said anti-kogation material is present in said ink jet ink composition in an amount of from about 0.25 to about 5 weight %.

* * * * *